United States Patent [19]

Blume et al.

[11] Patent Number: 4,963,165

[45] Date of Patent: Oct. 16, 1990

[54] COMPOSITE MEMBRANE, METHOD OF PREPARATION AND USE

[75] Inventors: Ingo Blume, Hengelo, Netherlands; Ingo Pinnau, Austin, Tex.

[73] Assignee: Membrane Technology & Research, Inc., Menlo Park, Calif.

[21] Appl. No.: 295,686

[22] Filed: Oct. 31, 1988

Related U.S. Application Data

[63] Continuation-in-part of Ser. No. 43,227, Apr. 27, 1987, abandoned.

[51] Int. Cl.$^5$ .................. B01D 53/22; B01D 61/36; B01D 71/56
[52] U.S. Cl. .................................. 55/16; 55/68; 55/158; 427/385.5
[58] Field of Search ............... 55/16, 68, 158; 210/500.38

[56] References Cited

U.S. PATENT DOCUMENTS

| | | | |
|---|---|---|---|
| 3,767,737 | 10/1973 | Lundstrom | 264/41 |
| 3,798,185 | 3/1974 | Skiens et al. | |
| 3,837,146 | 9/1974 | Faure et al. | 55/158 |
| 3,874,986 | 4/1975 | Browall et al. | 161/160 |
| 3,980,456 | 9/1976 | Browall | 55/158 |
| 4,132,824 | 1/1979 | Kimura et al. | 428/220 |
| 4,156,597 | 5/1979 | Browall | 55/16 |
| 4,218,312 | 8/1980 | Perry | 55/16 X |
| 4,230,463 | 10/1980 | Henis et al. | 55/68 X |
| 4,230,838 | 10/1980 | Foy et al. | 525/408 |
| 4,243,701 | 1/1981 | Riley et al. | 427/244 |
| 4,277,344 | 7/1981 | Cadotte | 210/654 |
| 4,331,786 | 5/1982 | Foy et al. | 525/408 |
| 4,332,920 | 6/1982 | Foy et al. | 525/408 |
| 4,406,673 | 9/1983 | Yamada et al. | 55/16 |
| 4,415,608 | 11/1983 | Epperson et al. | 427/244 |
| 4,440,643 | 4/1984 | Makino et al. | 55/158 X |
| 4,444,662 | 4/1984 | Conover | 55/16 X |
| 4,528,004 | 7/1985 | Makino et al. | 55/16 X |
| 4,559,139 | 12/1985 | Uemura et al. | 210/490 |
| 4,581,043 | 4/1986 | van der Scheer | 55/16 |
| 4,608,060 | 8/1986 | Kulprathipanja et al. | 55/16 |
| 4,650,574 | 3/1987 | Hilgendorff et al. | 55/158 X |
| 4,663,050 | 5/1987 | Li et al. | 55/16 X |
| 4,664,669 | 5/1987 | Ohyabu et al. | 55/16 X |
| 4,673,418 | 6/1987 | Peinemann | 55/16 X |

FOREIGN PATENT DOCUMENTS

| | | | |
|---|---|---|---|
| 0113574 | 7/1984 | European Pat. Off. | 55/158 |
| 59-210952 | 11/1984 | Japan | 55/158 |
| 60-235624 | 11/1985 | Japan | 55/16 |

OTHER PUBLICATIONS

W. J. Ward, III et al., "Ultrathin Silicone/Polycarbonate Membranes for Gas Separation Processes", *J. Memlo Sci.* 1, 99–108 (1976).

R. L. Riley et al., "Preparation of Ultrathin Reverse Osmosis Membranes and the Attainment of Theoretical Salt Rejections", *J. Appl. Poly. Sci.* 11, 2143–2158 (1967).

*Synthetic Polymer Membranes*, 2nd Ed. Chapter 7, "Phase-Inversion Membranes", pp. 237–285.

S. S. Kremen, "Technology and Engineering of Roga Spiral-Wound Reverse Osmosis Membrane Modules", Chapter 17, pp. 371–385.

S. Loeb et al., "Sea Water Demineralization by Means of an Osmotic Membrane", Advances in Chem. Series 38, 117–132 (1963).

H. Strathmann et al., "The Formation Mechanism of Asymmetric Membranes", *Desalination*, 16, 179–203 (1975).

Pebax Technical Information, 12 pages.

*Primary Examiner*—Robert Spitzer
*Attorney, Agent, or Firm*—J. Farrant

[57] ABSTRACT

A membrane for gas separation or pervaporation. The membrane is a composite of a microporous support membrane and an ultrathin permselective membrane, the permselective membrane being made from a polyamide-polyether block copolymer having the general form:

$$HO{+}C{-}PA{-}C{-}O{-}PE{-}O{\overline{1_n}}H$$
$$\phantom{HO+}\underset{O}{\|}\phantom{-PA-}\underset{O}{\|}$$

where PA is a saturated aliphatic polyamide segment, PE is a polyether segment, and n is a positive integer. The membrane is particularly useful in separating polar gases from non-polar gases.

30 Claims, 4 Drawing Sheets

COMPOSITE MEMBRANE, METHOD OF PREPARATION AND USE

This application is a continuation-in-part of U.S. patent application Ser. No. 043,227 filed Apr. 27, 1987, now abandoned.

FIELD OF THE INVENTION

The present invention relates to separation membranes, and methods of making and using them. More particularly, the invention concerns a composite structure having a microporous support coated with a very thin permselective layer of a polyamide-polyether block copolymer material. The resulting membrane exhibits unusual gas, vapor and liquid separating properties.

BACKGROUND OF THE INVENTION

Permselective membranes for gas separation are known, and commercial gas-separation membranes are beginning to challenge conventional technology in such areas as the production of oxygen-enriched air, nitrogen production for blanketing and other industrial applications, separation of carbon dioxide from methane, and hydrogen recovery from various gas mixtures.

The principal current types of high-performance gas-separation membranes have developed from the anisotropic, cellulose acetate, reverse-osmosis membranes of Loeb and Sourirajan. (S. Loeb and S. Sourirajan, "Sea Water Demineralization by Means of an Osmotic Membrane", ACS Advances in Chemistry Series 38, 117 (1963)) It is possible to make membranes with good characteristics in this way, and gas-separation membranes of this type have found some commercial application. However, a limited number of polymers that can be used to make anisotropic membranes with useful gas fluxes and selectivities is known.

An alternative approach is to coat a Loeb-Sourirajan anisotropic membrane with a thin, permeable sealing layer as disclosed in U.S. Pat. No. 4,230,463 to Henis and Tripodi. The sealing layer, typically silicone rubber, does not function as a selective barrier, but rather serves to plug defects in the permselective membrane, and reduce to negligible amounts the gas flow through these defects. Because the selective layer no longer has to be completely defect-free, membranes of this type can be made thin more easily than regular Loeb-Sourirajan membranes. The increase in flux that is possible with a very thin permselective layer more than compensates for the slight loss in flux caused by the presence of the sealing layer. The selective layer must still be sufficiently thick to withstand normal operating pressures in use.

A third type of gas separation membrane is a composite structure comprising a high permeability porous support membrane and a thin permselective membrane. In contrast to Loeb-Sourirajan membranes, the strength function is separated from the permselective function in this case. U.S. Pat. No. 4,243,701 to Riley and Grabowsky describes such membranes, as does a paper by Ward et al. (W. J. Ward III, W. R. Browall and R. M. Salemme, "Ultrathin Silicone/Polycarbonate Membranes for Gas Separation Processes", J. Memb. Sci. 1, 99 (1976). A disadvantage encountered with these membranes is that a defect-free coating cannot be obtained without making the permselective layer relatively thick, and consequently relatively low-flux.

Another possible membrane structure is a three-layer composite in which strength, sealing and permselective functions are all separated and performed by different elements of the composite. The membrane substrate layer is a finely microporous support film that has no permselective properties but gives mechanical strength to the composite system. This substrate is coated with a thin rubbery sealing layer which plugs the support defects and provides a smooth surface onto which the top layer may be coated. With this configuration, the permselective layer may be extremely thin, and the resulting composite membrane can produce high permeate fluxes at modest pressures. U.S. Pat. No. 3,874,986 to Browall and Salemme discloses a membrane of this type with a permselective layer of polyphenylene oxide. Japanese Laid-Open Application No. 59-59214 describes another such membrane in which the permselective layer is polymethylpentene, and Japanese Laid-Open Application No. 59-112802 gives an example of this type of composite with polybutadiene permselective coating. It is also known in the art to apply yet another permeable coating on top of the permselective layer to protect it from physical damage, and composites of this type are disclosed for example in Japanese Laid-Open Applications No. 59-66308 and 60-137418. The general concept of coating a composite membrane with a rubbery top layer is disclosed in U.S. Pat. No. 3,980,456 to Browall. Multilayer composite membranes as described above give good results, but are more complex and costly to manufacture than simpler structures. It may be possible to design membrane configurations that give excellent results in small-scale test stamps, but it is very difficult to produce these membranes in large sheets or rolls suitable for commercial use.

The teachings of the art also include diverse methods for making permselective membranes and membrane elements. Asymmetric Loeb-Sourirajan membranes are normally made by a phase-inversion casting process. Sealing or selective layers may be coated on a microporous support by solvent evaporation. U.S. Pat. No. 4,243,701 to Riley and Grabowski, for example, teaches a method of casting a thin permselective film on the surface of a porous support membrane by a solvent casting technique using halogenated hydrocarbon solvents. Alternatively, films as thin as 50 Angstroms may be prepared by spreading and stretching a polymer solution on water. References describing this liquid casting method include U.S. Pat. No. 3,767,737 to Lundstrom and U.S. Pat. No. 4,132,824 to Kimura et al. The films thus made may be picked up on or laminated to a microporous support by vacuum pick-up or other techniques known in the art.

Alternatively, the permselective membrane may be polymerized directly on the support membrane by a variety of techniques. In some cases this involves coating the support with a prepolymer solution. For example, silicone rubber layers are normally applied to composites in prepolymer form and then cured to form the finished polymer. In other cases, the agents involved are not prepolymers for the finished material, so that a more basic chemical change is involved. For example, reverse osmosis membranes can be made by interfacial polymerization, as disclosed for instance in U.S. Pat. Nos. 4,277,344 to Cadotte or 4,559,139 to Uemura and Kurihara. U.S. Pat. No. 4,581,043 to van der Scheer covers a method of making gas separation membranes where the ultrathin selective layer is formed by plasma polymerization directly on the support. U.S. Pat. No. 4,440,643, to Makino et al. describes a method for making polyimide membranes by coating a polyimide support with a solution of polyamic acid, then treating the coated substrate at high temperature to convert the polyamic acid by imide-cyclization to a polyimide.

In spite of the considerable research effort in separation membranes in recent years, few sucessful commercial gas separation membranes have been made. A significant problem is that improved selectivities for one gas over another are generally obtained at the expense of permeability. Permeability is a measure of the rate at which a particular gas moves through a membrane of standard thickness under a standard pressure difference. Permeability depends both on the solubility of the permeating gas in the polymer and its diffusion coefficient. In general, better selectivities are obtained with glassy or crystalline polymers, because the diffusion coefficient in this type of material is more dependent on molecular size than it is with rubbery materials. Therefore separations on the basis of molecular size are possible. For instance, glassy polymers are typically considerably more selective to hydrogen than to other gases, and in fact hydrogen separation is a commercial application for polysulfone, cellulose acetate and polyimide membranes. However, because they are rigid and inflexible, glassy polymer membranes are typified by low fluxes. On the other hand, rubbery or elastomeric materials with flexible polymer chains are relatively permeable to many gases, but not very selective for one gas over another. To date silicone rubber and other elastomers have found application more as high-flux sealing layers, as in the Monsanto Prism membrane, than as permselective materials. In all composite membranes, whether they include glassy or rubbery coatings, or both, the flux through the permselective layer increases as the thickness of that layer decreases. It is therefore desirable to make the permselective layer very thin. This also present problems, in that very thin, defect-free coatings are difficult to make.

Membrane materials that can give better separation performance, i.e. high flux and high selectivity, are needed. To be useful as the permselective component of a composite membrane, a polymer must not only have good intrinsic gas permeability and selectivity, but must also have the appropriate physical or chemical properties to enable the composite to be made. That is, it must be capable of deposition on the support membrane by a process amenable to large-scale production, without damage to the support membrane, and should be able to withstand the normal operating conditions of that membrane. New polymeric materials with good intrinsic permeability and selectivity properties must be sought. Even when such a polymer is found, however, it may not possess the other necessary characteristics for a composite membrane material, or the technology required to utilize it may be lacking.

SUMMARY OF THE INVENTION

The present invention is a membrane for use in gas, vapor or liquid separations. The invention also encompasses methods of making and using the membrane. The membrane is a composite of a microporous support membrane coated with a very thin permselective layer of a polyamide-polyether block copolymer having the following formula:

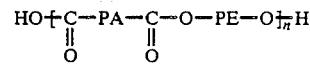

where PA is a saturated aliphatic polyamide segment, PE is a polyether segment, and n is a positive integer. The permselective layer is applied by solution coating and therefore can be made very thin, typically having a thickness of 5 μm or less.

Polyamide-polyether block copolymers for use in the invention are available commercially, for example as Pebax ® from Atochem Inc. Polymers Division, 266 Harristown Road, Glen Rock, NJ 07452, or as Vestamid ® from Nuodex Inc., P.O. Box 365, Piscataway, NJ 08854. The properties of these polymers, as described in the manufacturer's literature, include chemical resistance to acids, bases and organic solvents, impermeability to air, and handling and conversion capabilities comparable to polyamides, that is by molding or extrusion. Presumably because of their polyamide component, these copolymers are extremely difficult to dissolve, except in solvents that would destroy the support membrane. U.S. Pat. No. 4,331,786 to Foy et al. teaches that these polymers are elastomers whose application is in articles required to be impervious barriers to gas or liquid transport, such as joints, bellows, barrier membranes or balloons. On this basis, these polymers do not appear to have appropriate properties for making solution-coated composite membranes with useful gas permeation or separation characteristics. Consequently their suitability as candidates for ultrathin permselective membranes has not been previously investigated.

Despite the above teachings, applicants have found that the polyamide-polyether block copolymer solutions taught herein have unexpected and advantageous membrane-making properties not previously available to the art. Once formed, the membranes of the invention may be used as flat sheets or more preferably wound and encased to make spiral modules.

The composite membranes of the invention exhibit unusual and unexpected properties. The permselective layer can be coated onto a support at thicknesses less than 1 μm without defects, and without the need for an intermediate or top sealing layer. Unlike silicone rubber or many other polymers, the permselective material is applied directly as a polymer solution, and does not require curing, heat treating or other chemical reaction for polymerization. Preparation of the composite is therefore a simple, one-step process. The permselective material is an elastomer, and exhibits generally useful gas permeabilities, and for some gases exceptionally high permeabilities. In combination with these high permeabilities, the selectivities, particularly for polar gases over non-polar gases, and more particularly, for carbon dioxide or acid gases such as sulfur dioxide or hydrogen sulfide over other gases, are extremely high. For various separations, the flux/selectivity combinations are higher than have been previously possible in the art.

The combination of high flux, high selectivity, and defect-free thin coating is a useful advance in the field of composite separation membranes.

It is an object of the present invention to provide an improved composite membrane for gas, vapor or liquid separation.

It is another object of the present invention to provide a composite membrane combining high flux and high selectivity for a number of gases.

It is another object of the invention to provide a composite membrane including a polyamide-polyether permselective membrane.

It is another object of the invention to provide a composite membrane including a solution-cast, ultrathin, polyamide-polyether permselective membrane.

It is another object of the invention to provide a composite membrane useful for separating polar gases from non-polar gases.

It is another object of the invention to provide a composite membrane useful for separating carbon dioxide from gas mixtures.

It is another object of the invention to provide a composite membrane useful for separating sulfur dioxide from gas mixtures.

It is another object of the invention to provide a composite membrane useful for separating hydrogen sulfide from gas mixtures.

It is another object of the invention to provide a composite membrane useful for pervaporation.

It is another object of the invention to provide a one-step method for making high performance, defect-free composite membranes.

It is another object of the invention to provide a solution-coating method for making polyamide-polyether block copolymer permselective membranes.

It is another object of the invention to provide low-polymer concentration, viscous or gelling solutions of polyamide-polyether block copolymers.

Additional objects and advantages will be apparent from the description of the invention to those skilled in the art.

DETAILED DESCRIPTION OF THE INVENTION

The term permselective as used herein refers to polymers, or membranes made from those polymers, that exhibit selective permeation for at least one gas in a mixture over another gas in that mixture, enabling a measure of separation between those gases to be achieved.

The term multilayer as used herein means comprising a support membrane and one or more coating layers.

The term ideal separation factor as used herein means the separation factor of a membrane or membrane element for one gas over another as determined with tests using pure gas samples rather than gas mixtures.

The present invention is concerned with the use of polyamide-polyether block copolymers as permselective membranes for gas separation or pervaporation. These polymers consist essentially of repeating units having the general formula:

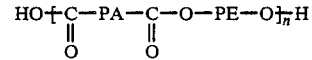

where PA is a linear saturated aliphatic polyamide sequence, PE is a polyether group, and n is a positive integer.

These polymers are made by reacting an acid-terminated polyamide with an alcohol-terminated polyether. Methods of preparation are disclosed in U.S. Pat. No. 4,332,920, Col. 1, line 60 to Col.4, line 36; U.S. Pat. No. 4,230,838, Col.2, line 17 to Col.3, line 40; and U.S. Pat. No. 4,331,786, Col.4, line 7 to Col.5, line, 31, all to Foy et al., which patents are incorporated herein by reference. The polyamide sequence may be prepared from a lactam or amino acid having a hydrocarbon chain containing 4 to 14 carbon atoms, or from an aliphatic dicarboxylic acid and a diamine, and has an average molecular weight between 300 and 15000. The polyether sequence is formed from linear or branched aliphatic polyoxyalkylene glycols or mixtures thereof, and has an average molecular weight in the range about 200 to 6000.

These polymers are available commercially as Pebax ® from Atochem Inc. Polymers Division, 266 Harristown Road, Glen Rock, NJ 07452. A range of grades with varying hardness is available; the harder the grade, the greater is the proportion of polyamide in the copolymer. The harder grades tend to have higher selectivities; the softer grades have higher permeation rates. The harder grades are more insoluble than the softer grades. The preferred grades for use in the context of the present invention are those in the middle range, such as 3533, 4033, 4011 and 5533.

In an alternative method for making polyamide-polyether block copolymers, a normal amine-terminated polyamide is chain terminated with a dicarboxylic acid such as (COOH—(CH$_2$)$_{10}$—COOH), which is then reacted with a polyether as described above. Polymers of this type are available commercially as Vestamid ® from Nuodex Inc., P.O. Box 365, Piscataway, NJ 08854. These are also made in a range of grades; in the context of the present invention the preferred grades include E40 S-3 and E47MS-3.

Figure 1:
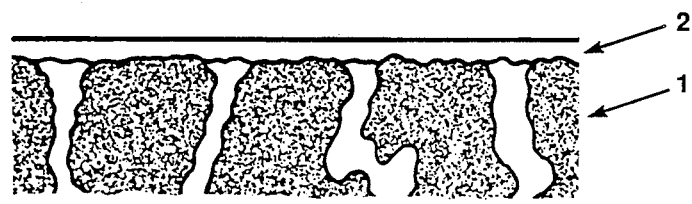
FIG. 1 is a schematic representation of a preferred embodiment of the invention comprising an ultrathin layer of polyamide-polyether block copolymer supported on a microporous support.
Figure 2:
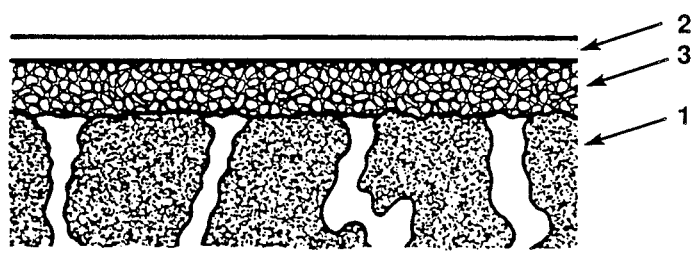
FIG. 2 is a schematic representation of an alternative embodiment of the invention comprising a microporous support membrane, an intermediate sealing layer and a permselective polyamide-polyether block copolymer top layer.
Figure 3:
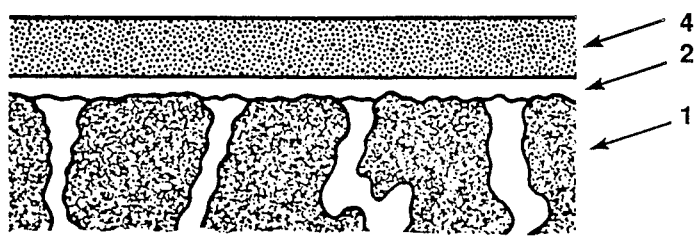
FIG. 3 is a schematic representation of another alternative embodiment of the invention comprising a microporous support membrane, a permselective polyamide-polyether block copolymer layer, and a protective top layer.

Referring now to the drawing, FIG. 1 shows a preferred embodiment of the invention comprising a microporous support membrane 1, onto which is coated an ultrathin permselective layer of polyamide-polyether block copolymer 2. FIG. 2 shows an alternative embodiment comprising a microporous support membrane 1, an intermediate sealing layer 3, and an ultrathin permselective polyamide-polyether block copolymer layer 2. FIG. 3 shows an alternative embodiment comprising a microporous support membrane 1, an ultrathin permselective polyamide-polyether block copolymer layer 2, and a top protective coating 4.

In each case, the function of the microporous support membrane is to give physical strength to the composite structure, and it has essentially no selective properties itself. It should have a very small flow resistance compared to the permselective layer. Preferably, the microporous support membrane will be an asymmetric membrane with a relatively dense surface layer. The surface pore size should be sufficiently small that the sealing or permselective polymer can form a continuous coating. Normally a surface pore size of 1 micron or less is preferred. Techniques for preparing microporous membranes are known in the art, and are discussed, for example, in *Synthetic Polymeric Membranes*, Second Edition, Robert E. Kesting, McGraw-Hill, New York (1985), Chapter 7. The choice of polymer used to make the microporous support, while not critical to the invention, is important. The physical properties of the support should contribute sufficient mechanical strength to the composite that it can withstand prolonged exposure to the pressure differences under which gas separation membranes operate, typically up to 1500 psi. It should be thermally stable over approximately the same temperature range as the permselective or sealing layers to be used. It should be capable of forming a smooth surface onto which the other layers of the composite may be coated, and it should withstand attack by the solvents used to apply the subsequent layers. Since polyamide-polyether block copolymers are very difficult to dissolve, and may demand the use of aggressive solvents and dissolution techniques, as discussed in detail below, this is a particularly pertinent consideration. Suitable polymers that may be used to make the microporous membrane include, but are not limited to polysulfones, such as Udel P3500 ® (Union Carbide, Danbury, Connecticut) or more preferably a polyamide, for example Nomex ® (DuPont, Wilmington, Delaware), Trogamid-T (Dynamit Nobel, Rockleigh, New Jersey) or Grilamid ® (Emser Industries, P.O. Box 1717, Sumter, SC 29151-1717). Other suitable materials are crosslinked polyimides, or polyetherther ketones, such as Victrex ® (ICI Americas Inc., Wilmington, Delaware) or UltrasonE ® (BASF, Ludwigshafen, West Germany). Some commercially available membranes might be usable in this context, depending on their solvent resistance. Examples include the NTU 3050 ®, a solvent resistant ultrafilration membrane, and the NTU 4220 ®, both available from Nitto Electric Industrial Co., Osaka, Japan. Optionally, other possible support membranes are to be found among those described in an article by H. Strathmann, K. Kock, P. Amar and R. W. Baker, in "The Formation Mechanism of Asymmetric Membranes", *Desalination* 16, 175 (1975). Further examples of polymers which may be used to prepare the microporous support layer may be found among those listed in U.S. Pat. No. 4,230,463 to Henis and Tripodi, column 14, lines 14 through 54, incorporated herein by reference.

Because the polyamide-polyether block copolymers of the invention are resistant to many common organic solvents, and have to be dissolved in aggressive solvents before they can be coated on the support, a particularly preferred choice for the microporous support layer is a solvent-resistant amorphous polyamide such as Trogamid-T ® (Dynamit Nobel, Rockleigh, New Jersey). Alternatively PI-2080 ® (Upjohn, North Haven, Connecticut), a solvent-resistant polyimide is another preferred material. The support membrane should be sufficiently thick to provide strength to the composite, but not so thick as to impair the permeability characteristics. Generally a thickness of 30–200 microns, is envisaged, with a preferred thickness of approximately 50 microns.

To coat the microporous support with the permselective membrane, it is necessary to prepare a dilute solution of the copolymer. Solubility relations in polymer systems are more complex than those among low-molecular weight compounds because of the size difference between polymers and solvents, the viscosity of the solution and the effects of morphology and molecular weight of the polymer. In polyamides (nylons) and similar crystalline polymers, high intermolecular forces and strong hydrogen bonding forces prevent dissolution, and it is difficult to predict solubility. These polymers may be completely insoluble except at temperatures near their crystalline melting points. They may be dissolved in a few very polar solvents that interact strongly with the polymer to break down the hydrogen bonds. For these reasons, very few solvents dissolve polyamides readily, and almost none are useable at room temperature. Solvents suggested for polyamides in Polymer Handbook (Second Edition, J. Brandrup et al. Eds., Wiley Interscience, New York, 1975) include phenol, m-cresol, formic acid, concentrated sulfuric acid, hydrogen chloride/methanol and liquid sulfur dioxide. These are extremely unsuitable solvents for the preparation of thin film composite membranes, especially on a large scale, because they are difficult to handle, and would attack most support membranes. Manufactures' literature indicate that polyamide-polyether block copolymers do not dissolve at room temperature in sulfuric acid, sodium hydroxide, ethanol, propanol, butanol, methylene chloride, trichloroethylene, perchloroethylene and freons.

Applicants' experiments confirmed that heating a mixture of the Pebax grades 2533, 3533, 4033, 4011, 5533, and 6333 with a large excess of solvent has no effect on solubility in many common solvents. Solvents which cannot dissolve Pebax, even after heating, include chloroform, cyclohexane, methylene chloride, methanol, propanol and mixtures of these. Experiments with Vestamid showed that it is harder to dissolve. This lack of solubility is not surprising since it is well known that polyamides are difficult to dissolve, and polyamides are one of the two building blocks forming the copolymer. Thus these polyamide-polyether copolymers are unlikely candidates for making composite membranes by the standard techniques of the art.

Applicants' discovery that n-butanol or 1-1-2 trichloroethane can dissolve small amounts of polyamide-polyether block copolymers on prolonged heating at temperatures approaching the boiling points of the solvents is unexpected, and provides a coating solution with a number of advantages. These solutions cannot contain more than about 5–6 wt % polymer, and typically 2 wt % or less can be dissolved. When such solutions are prepared, it is found that they have unexpectedly good coating characteristics when applied to a microporous support. At a raised temperature, the solutions have low viscosities, and coat easily and uniformly on a support membrane. However, they gel or become very viscous almost instantaneously as the solvent evaporates and the solution begins to cool. The polymer film thus formed does not penetrate into the pores of the microporous support nor break up by surface tension effects. Thus the property of these polymer solutions of gelling at low concentrations results in a selective layer that is defect-free, without the need to use an intermediate or top sealing layer, and without the need for temporarily filling the support pores to prevent penetration. This distinguishes these copolymer solutions from very dilute solutions of more readily dissolved polymers. Also, because these gelling solutions are very dilute when applied to the support, the permselective layer after the solvent has evaporated is very thin. Solutions that gel at higher polymer concentrations do not have this advantage, because after evaporation the resulting membrane is relatively thick, with correspondingly lower flux. Low-viscosity, support-wetting, solutions that do not gel penetrate the pores of the support membrane rather than spanning them, resulting in defects in the permselective coat. Thus the unusual and unexpected combination of good coating characteristics and low-concentration gelling means that these polymer solutions offer an advance in membrane-making methods and membrane materials.

Another advantage of the polyamide-polyether block copolymers used in the present invention is that they are rubbers at temperatures at least down to 0° C. However, no curing step is required after coating. Rubbery polymers currently used in composite membranes are generally coated onto the microporous support membrane as monomers or low-molecular-weight prepolymers. They are then cured, for example by heating or irradiation, to crosslink the polymer to the extent necessary to produce the desired membrane properties.

A preferred embodiment of the invention is that of FIG. 1, namely a microporous support directly coated with polyamide-polyether block copolymer. Nevertheless, should circumstances dictate, optional embodiments such as those of FIG. 2 or FIG. 3 are also possible. In these cases the choice of material for the intermediate or top sealing layer would be one with high permeability for the gases or vapors to be separated. Solutions of the material should also be capable of wetting the microporous layer in such a way as to form a smooth, continuous coat. In general, rubbery material are preferred, because of their permeability and flexibilty properties. The most preferred material for the sealing coat is silicone rubber, which has good permeability characteristics and wets the microporous support freely in solution. Constituents for preparing silicone rubber, such as polymerizable oligomers or linear polymers, may be obtained from General Electric Co., Waterford, New York, or Dow Corning Co. Midland, Michigan. Silicone rubber is very permeable, and silicone rubber layers can easily be made thin enough by the techniques hereinafter described in detail to allow a high gas or vapor flux. The thickness of the sealing layer should preferably be less than five microns, generally in the range 0.5 to 2 microns, and ideally 1 micron or less.

Figure 4:
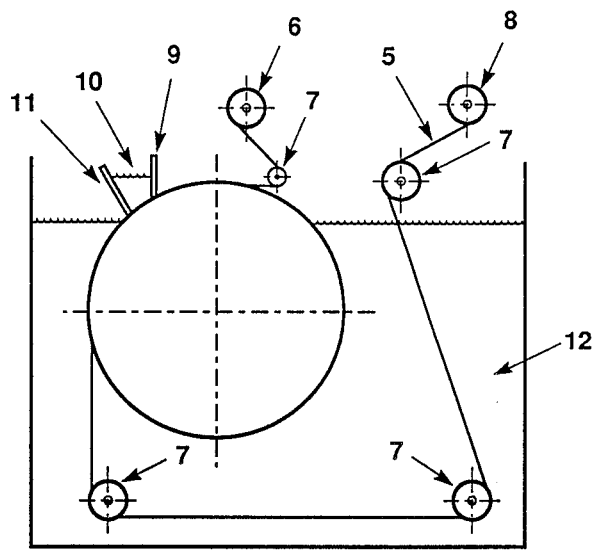
FIG. 4 is a schematic representation of a Loeb-Sourirajan membrane casting machine.

To prepare the preferred embodiment of the invention shown in FIG. 1, the microporous support membrane is cast. FIG. 4 is a schematic representation of a membrane casting machine, developed for making asymmetric Loeb-Sourirajan reverse osmosis membranes, that may be used to continuously cast the support membranes of the present invention onto a moving belt of polyester, or like, fabric. Referring now to this figure, a moving belt of the fabic web, 5, feeds from the fabric roll 6, across a series of rollers 7, to the take-up roll 8. A trough 9, contains the casting solution 10, which consists of a polymer solution dissolved in a water miscible solvent. The casting solution is doctored onto the moving fabric belt by a blade 11. The belt then passes into a water bath 12 which precipitates the polymer to form the membrane. The belt is collected on the take-up roll 8, after which the membrane is washed overnight to remove any remaining solvent and finally dried.

The permselective membrane is preferably formed on the microporous support by solution coating. The principles of this method are described in U.S. Pat. No. 4,243,701 to R .L. Riley et al. or in U.S. Pat. No. 4,553,983 to R .W. Baker. To apply this method to the present invention, a dilute solution of polyamide-polyether block copolymer is prepared by heating the polymer in a large volume of solvent to 80° C. or 90° C. and maintaining this temperature for 10 hours.

Figure 5:
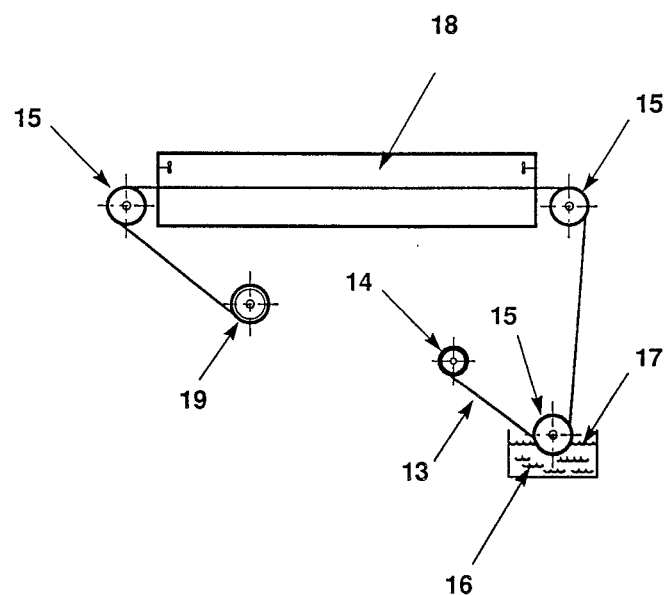
FIG. 5 is a schematic representation of a dip-coating apparatus used to prepare composite membranes.

The preferred solvents are n-butanol or 1,1,2-trichloroethane. A less preferred solvent is concentrated formic acid. Other solvents that might be tried for some polymer grades include acetic acid, alcohols such as n-propanol, i-propanol, 1-butanol, 2-butanol, n-hexanol, n-heptanol, n-octanol, cyclohexanol and benzylalcohol, halogenated hydrocarbons such as tetrachloromethane, methylene bromide, bromoform, tetrabromomethane, 1,2-dichloroethane, 1,1-dichloroethane, 1,1,1-trichloroethane, 1,1,2,2-tetrachloroethane, trifluorotrichloroethane, trichloroethylene and tetrachloroethylene. A thin film of the polymer solution is deposited on the microporous support surface by immersing and then slowly withdrawing the support from the solution. When the solvent evaporates, an extremely thin polymer layer is left behind. Alternatively, the thin polymer film can be deposited first on a surface such as a glass plate, and then floated off onto a water surface and deposited on the microporous substrate in a separate operation. FIG. 5 is a schematic repesentation of a simple dip-coating apparatus, which can be used to deposit both the optional sealing and top layers and the permselective layer of the composite membrane. Referring now to this figure, the support membrane 13, passes from the feed roll 14 across a series of rollers 15. The dip coating tank 16 contains a dilute solution 17, of the polymer to be deposited, which coats the travelling membrane support with a liquid layer 50 to 100 microns thick. The membrane then passes through a drying oven 18 and is wound up on a variable-speed, motor-driven take-up roll 19. After evaporation of the solvent, a polymer film 0.1 to 20 microns thick is left on the membrane. The thickness and the number of defects in the coating depend on the concentration and viscosity of the solutions involved, the nature of the support membrane and the application parameters of the process. With the polymers of the present invention, the concentration in solution will be 5 wt % or less, or 2 wt % or less, and the coating solution temperature should be in the range 10° C. to 90° C., preferably 40° C. The thickness of the permselective membrane after solvent evaporation should be 0.1 to 20 microns, preferably 5 microns or less, and more preferably 0.1 to 1 micron.

According to the manufacturers' literature, the polyamide-polyether block copolymers used in the invention can be handled by the moulding or extrusion methods used for nylons. This suggests that as an alternative to solution coating or casting, it would be possible to form these copolymers by extrusion into fibers or by melt pressing into films. It is known in the art to make microporous, asymmetric or homogeneous hollow fibers by extrusion, as disclosed for instance in U.S. Pat. Nos. 3,798,185 to Skiens et al., 4,020,230 to Mahoney et al. and 4,454,085 to Schindler et al. However, as also taught by these patents, the wall thickness of the fiber made in this way is typically 50-300 μm or above. The same range of thicknesses applies to pressed or molded films. To applicants' knowledge, it is not possible to make films or fibers sufficiently thin to achieve the fluxes demonstrated by the present invention by molding, heat pressing or extrusion. The copolymer solutions provided by the present invention could, however be used to coat hollow fiber support membrane with an ultrathin permselective membrane.

The optional embodiment shown in FIG. 2 is prepared by first coating the microporous support with a thin silicone rubber, or other sealing layer, and then repeating the coating step with the permselective layer. Likewise, the microporous support may be first coated with the permselective element, and then overcoated with a protective layer, as shown in the embodiment of FIG. 3.

Once formed, the composite membranes of the invention may be used in any separation device known in the art of membrane gas separation or pervaporation. A preferred configuration for the finished composite membrane is a spiral-wound module. The making of such modules is known in the art, and is described in detail in, for instance, in S .S. Kremen, "Technology and Engineering of ROGA Spiral Wound Reverse Osmosis Membrane Modules", in *Reverse Osmosis and Synthetic Membrane* S. Sourirajan (Ed), National Research Council of Canada, Ottawa (1977). Alternatively, the membrane may be used in a flat sheet plate-and-frame configuration. A composite membrane might also be formed by coating micropoorous hollow fibers made by any of the techniques known in the art with a thin polyamide-polyether block copolymer layer.

The polyamide-polyether block copolymer membranes of the present invention have good mechanical, thermal and chemical stability in use. The polyamide-polyether element is stable at high temperatures, up to around 150°14 200° C, depending on the grade, and is resistant to plasticization or attack by components that may be found in the feed stream.

The composite membranes of the present invention have remarkable and unexpected properties. As demonstrated in the Examples, for a variety of gas separations, they can achieve a combined flux/selectivity performance hitherto not achieved in the art. For the separation of polar gases from non-polar gases, the selectivities, obtained with gas mixtures and under operating conditions equivalent to those encountered in industry are as good, or better, than those reported for other membranes under ideal conditions, that is calculated from pure gas measurements at optimum pressures and temperatures. Non-limiting examples of gas separations that could be accomplished with the membranes of the invention include hydrogen sulfide from nitrogen, methane or carbon dioxide; carbon dioxide from nitrogen, methane, oxygen or hydrogen; sulfur dioxide or ammonia from nitrogen; and water vapor from air. The composite membranes also exhibit superior performance in pervaporation. These advantages, coupled with the advantageous, one-step preparation methods taught herein, supply a long-standing need in the art for commercially and economically viable separation membranes.

The invention is now described in further detail with reference to Examples 1 to 16. These examples are intended to be illustrative of the invention, and do not limit the scope of the invention in any way.

SOLUBILITY EXPERIMENTS

Example 1

Solubility experiments were carried out with Pebax® grades 2533, 3533, 4033, 4011, 5533 and 6333. Three grams of the polymer was weighed into a flask containing 50 grams of n-butanol or 100 grams of 1,1,2-tricholoroethane. The flasks were rolled for two weeks at room temperature on a mechanical bottle roller. None of the samples dissolved. Swelling, as measured by increase in wt %, was in the range 17-1600%. Results are summarized in Table 1.

TABLE 1

Swelling of Pebax grades after two weeks on a bottle roller at 20-22° C.

| Pebax grade | Swelling in n-butanol (wt %) | Swelling in 1,2-trichloroethane (wt %) |
|---|---|---|
| 2533 | 400 | 1600 (partially dissolved) |
| 3533 | 137 | 850 |
| 4033 | 37 | 250 |
| 5533 | 23 | 150 |
| 6333 | 17 | 60 |
| 4011 | 30 | 200 |

Example 2

Pebax grades 2533 and 3533 were tested in aliphatic alcohols, using the same method as above. None of the samples dissolved. The results are shown in Table 2.

TABLE 2

Swelling of Pebax grades after two weeks on a bottle roller at 20-22° C.

| Pebax grade | Swelling (wt %) in | | |
| | methanol | ethanol | n-butanol |
|---|---|---|---|
| 2533 | 34 | 80 | 520 |
| 3533 | 37 | 51 | 129 |

Example 3

Solubility experiments were conducted by measuring 3 g of Pebax into a flask containing 50 grams of n-butanol. The flask was heated to a temperature of 80°−90° C. for periods ranging from 2-10 hours. The results are summarized in Table 3.

TABLE 3

Dissolution of Pebax in high-temperature solvents.

| Pebax grade | Maximum solution concentration (wt %) |
|---|---|
| 2533 | 5-6 |
| 3533 | 5-6 |
| 4033 | 1-3 |
| 5533 | ~1 |
| 6333 | — |
| 4011 | 1-3 |

Grade 6333: less than 1% dissolved.

Similar results were obtained with 1,1,2-trichloroethane.

GAS SEPARATION EXAMPLES

Example 4

An anisotropic microporous support membrane was cast using the Loeb-Sourirajan technique. The casting solution was 17 wt % Trogamid-T in dimethylformamide, the casting speed of the machine was 3 m/min and the knife gap was set at 178 microns. The membrane was cast onto non-woven fabric. A multilayer membrane was made by coating a solution of 1.5 wt % Pebax 2533 in 1,1,2-trichloroethane onto the skin side of the anisotropic membrane using a dip method as described above. The copolymer solution was applied at a temperature of 40° C., and the composite membrane was dried by passing through an oven at 60°-70° C for 1-5 minutes. The ideal separation factor for the composite membrane was determined by measuring the gas flux of pure gases at a pressure of 50 psig and temperature of 20° C. The membrane area was 12.6 cm$^2$. The results obtained are shown in Table 4 below.

TABLE 4

Permeation properties of polyamide-polyether composite membranes. Pebax ® 2533

| Coating | P/lCO$_2$ | P/lN$_2$ | $\alpha CO_2/N_2$ |
|---|---|---|---|
| | [cm$^3$(STP)/cm$^2$sec · cmHg] | | |
| 1 × 1.5 wt % Pebax ® 2533 in 1,1,2-trichloroethane | | | |
| 1 | 1.5 × 10$^{-4}$ | 6.1 × 10$^{-6}$ | 24.5 |
| 2 | 1.4 × 10$^{-4}$ | 5.6 × 10$^{-6}$ | 25.0 |
| 3 | 1.4 × 10$^{-4}$ | 5.6 × 10$^{-6}$ | 25.0 |

Example 5

A composite membrane was prepared as described in Example 4, using a 1.5 wt % solution of Pebax 3533 in 1,1,2-trichloroethane. The membrane was tested as in Example 4. The results obtained are summarized in Table 5 below.

TABLE 5

Permeation properties of polyamide/polyether composite membranes. Pebax ® 3533

| Coating | P/lCO$_2$ | P/lO$_2$ | P/lN$_2$ | $\alpha O_2/N_2$ | $\alpha CO_2/N_2$ | $\alpha CO_2/O_2$ |
|---|---|---|---|---|---|---|
| | [cm$^3$(STP)/cm$^2$sec · cmHg] | | | | | |
| 1 × 1.5 wt % Pebax ® 3533 in 1,1,2-trichloroethane | | | | | | |
| 1 | 8.1 × 10$^{-5}$ | 8.0 × 10$^{-6}$ | 3.0 × 10$^{-6}$ | 2.7 | 27.0 | 10.1 |
| 2 | 1.4 × 10$^{-4}$ | 1.4 × 10$^{-5}$ | 5.3 × 10$^{-6}$ | 2.6 | 26.4 | 10.0 |
| 3 | 1.0 × 10$^{-4}$ | 9.5 × 10$^{-6}$ | 3.9 × 10$^{-6}$ | 2.4 | 25.6 | 10.5 |

Example 6

To determine the maximum selectivity of Pebax 3533 composite membranes, a Trogamid support as described in Example 4 was coated 10 times with a 1.5 wt % solution of Pebax 3533 in 1,1,2 trichloroethane. Gas fluxes and selectivities were determined using the same methods as in Example 4. The results are shown in Table 6 below.

TABLE 6

Performance of thick film polyamide-polyether composite membranes

| Coating | P/lN$_2$ | P/lO$_2$ | P/lH$_2$ | P/lCO$_2$ | $\alpha O_2/N_2$ | $\alpha CO_2/N_2$ | $\alpha CO_2/O_2$ | $\alpha CO_2/H_2$ |
|---|---|---|---|---|---|---|---|---|
| | [cm$^3$(STP)/cm$^2$sec · cmHg] | | | | | | | |
| 10 × 1.5 wt % Pebax ® 3533 in 1,1,2 trichloroethane | 7.1 × 10$^{-7}$ | 1.9 × 10$^{-6}$ | 4.0 × 10$^{-6}$ | 2.2 × 10$^{-5}$ | 2.7 | 31 | 12 | 5.5 |

Comparing these results with Table 5, it may be seen that the selectivities of the once-coated ultrathin composite membranes of Example 5 are almost as high as those of the 10-times-coated membrane. This indicates that composites with an ultrathin permselective membrane can be made by a simple one-step process and are essentially defect-free. The lower fluxes obtained with the 10-times-coated membrane indicate the advantage of ultrathin membranes.

Example 7

A coating solution was prepared by heating and stirring 1 g Vestamid grade E4OS-3 in 99 g 1,1,2 trichloroethane for two days at 80° C. Composite membranes were prepared by hand coating the solution onto Trogamid-T supports like those of Example 4, using a wick method. Composite membranes comprising both one and two coats of Vestamid were made. The membranes were tested as in Example 4. The permeation properties are summarized in Table 7 below.

TABLE 7

Permeation properties of polyamide-polyether composite membranes. Vestamid ® E40 S-3.

| Coating | P/lN$_2$ | P/lO$_2$ | P/lCO$_2$ | $\alpha O_2/N_2$ | $\alpha CO_2/N_2$ | $\alpha CO_2/O_2$ |
|---|---|---|---|---|---|---|
| | [cm$^3$(STP)/cm$^2$sec · cmHG] | | | | | |
| 1 × 1 wt % Vestamid ® E40 S-3 in 1,1,2 trichloroethane | 6.2 × 10$^{-6}$ | 1.5 × 10$^{-5}$ | 1.4 × 10$^{-4}$ | 2.4 | 23 | 9.3 |
| 2 × 1 wt % Vestamid ® E40 S-3 | | | | | | |
| #1 | 3.9 × 10$^{-6}$ | 1.0 × 10$^{-5}$ | 1.1 × 10$^{-4}$ | 2.6 | 28 | 11.0 |
| #2 | 2.5 × 10$^{-6}$ | — | 8.0 × 10$^{-5}$ | — | 32 | — |
| #3 | 3.0 × 10$^{-6}$ | — | 9.2 × 10$^{-5}$ | — | 31 | — |

The fluxes with the twice-coated membrane averaged about half that of the once-coated examples. The selectivity was slightly higher for the twice-coated examples.

Example 8

Composite membranes were made as in Example 7, using Vestamid grade E47 MS-3. As before, once-coated and twice-coated membranes were prepared. The membranes were tested as in the previous example.

The permeation properties are summarized in Table 8 below.

TABLE 8

Permeation properties of polyamide-polyether composite membranes. Vestamid ® E47 S-3.

| Coating | P/lN$_2$ P/lO$_2$ P/lCO$_2$ [cm$^3$(STP)/cm$^2$sec · cmHg] | | | $\alpha$O$_2$/N$_2$ | $\alpha$CO$_2$/N$_2$ | $\alpha$O$_2$/N$_2$ |
|---|---|---|---|---|---|---|
| 1 × 1 wt % Vestamid ® E47 MS-3 in 1,1,2 trichloroethane | 1.3 × 10$^{-5}$ | — | 2.3 × 10$^{-4}$ | — | 18 | — |
| 2 × 1 wt % Vestak ® E47 MS-3 in 1,1,2 trichloroethane | 5.6 × 10$^{-6}$ | — | 1.6 × 10$^{-4}$ | — | 29 | — |

Example 9

This example illustrates the production of high performance polyamide-polyether membranes with alternative support membranes and solvents. To make the microporous support membrane, using the same basic technique as in Example 4, a casting solution of 17.5 wt % Udel P 3500 polysulfone in 82.5 wt % dimethylformamide was prepared. This cast was on non-weave fabric at a casting speed of 3.5 m/min and casting thickness of 178 microns. The membranes were precipitated in water, washed for 24 hours, and dried in an oven at 80°–100° C.

One gram of Pebax grade 4033 was dissolved in 99 g butanol-1 by stirring the solution for 2 days at 80° C. The resulting 1% Pebax solution was hand coated onto the polysulfone support by wicking at 50° C. Two coats of Pebax solution were applied. The permeation properties of the resulting membranes are summarized in Table 9 below.

Table 9

Permeation properties of polyamide-polyether/polysulfone composite membranes. Pebax ® 4033.

| Coating | P/lN$_2$ P/lO$_2$ P/lCO$_2$ P/lH$_2$ [cm$^3$(STP)/cm$^2$sec · cmHg] | | | | $\alpha$O$_2$/N$_2$ | $\alpha$CO$_2$/N$_2$ | $\alpha$CO$_2$/O$_2$ | $\alpha$CO$_2$/H$_2$ |
|---|---|---|---|---|---|---|---|---|
| 2 × 1% Pebax ® 4033 in butanol-1 at 50° C. | 3.0 × 10$^{-6}$ | 9.3 × 10$^{-6}$ | 9.8 × 10$^{-5}$ | 2.8 × 10$^{-5}$ | 3.1 | 33 | 11 | 3.5 |

Example 10

Five grams of Pebax grade 4011 were dissolved in 95 g of formic acid by stirring the solution at room temperature for three hours. The Pebax 4011 formic acid solution was slowly diluted with propanol-2 until the solution started to gel. When heated to 50° C., the final solution, consisting of 2.6 wt % Pebax 4011, 48.7 wt % formic acid, and 48.7 wt % propanol-2, become clear. Polysulfone support membranes as described in Example 9 were hand coated with Pebax 4011 solution at 50° C. After drying, the resulting Pebax 4011 composite membranes were tested with pure gases at 20° C., and the results as shown in Table 10 below obtained.

TABLE 10

Permeation properties of polyamide-polyether/polysulfone composite membranes. Pebax ® 4011.

| Coating | P/lN$_2$ P/lO$_2$ P/lCO$_2$ [cm$^3$(STP)/cm$^2$sec · cmHg] | | | $\alpha$O$_2$/N$_2$ | $\alpha$CO$_2$/N$_2$ | $\alpha$CO$_2$/O$_2$ |
|---|---|---|---|---|---|---|
| 1 × 2% Pebax ® 4011 in formic acid/propanol-2 1:1 | | | | | | |
| #1 | 5.1 × 10$^{-7}$ | — | 3.5 × 10$^{-5}$ | — | 69 | — |
| #2 | 4.7 × 10$^{-7}$ | — | 2.7 × 10$^{-5}$ | — | 57 | — |
| #3 | 4.4 × 10$^{-7}$ | 2.6 × 10$^{-6}$ | 3.1 × 10$^{-5}$ | 5.9 | 70 | 12 |
| #4 | 2.7 × 10$^{-7}$ | 1.3 × 10$^{-6}$ | 1.7 × 10$^{-5}$ | 4.8 | 63 | 13 |

Example 11

A multilayer composite membrane was prepared by coating polysulfone support membranes as described in Example 9 first with an intermediate sealing layer of silicone rubber, and then with a 1 wt % solution of Pebax 4011 in 1-butanol. The resulting composite was tested at 23° C with a gas mixture at 2.5 psig pressure containing 82.6% N$_2$, 7.0% O$_2$, 10.0% CO$_2$ and 0.4% SO$_2$. The permeating gas was kept at 22 mmHg absolute pressure and contained 13.2% N$_2$, 2.5% O$_2$, 72.5% CO$_2$ and 11.8% SO$_2$. The individual gas permeation properties are given in Table 11.

TABLE 11

Permeation properties of Pebax ® 4011 composite membrane

| Gas | Flux (P/l) cm$^3$(STP)/cm$^2$.s.cmHg | Selectivity over N$_2$ |
|---|---|---|
| N$_2$ | 5.0 × 10$^{-6}$ | 1 |
| O$_2$ | 1.1 × 10$^{-5}$ | 2.2 |
| CO$_2$ | 2.8 × 10$^{-4}$ | 56 |
| SO$_2$ | 3.5 × 10$^{-3}$ | 700 |

This composite has an exceptional SO$_2$/N$_2$ selectivity of 700, at an SO$_2$ partial feed pressure of 3.6 mmHg. Table 12 below displays higher values for the SO$_2$/N$_2$ selectivity of other membranes, but these values have been obtained at SO$_2$ partial feed pressure of 760 mmHg and higher. The work of Kuehne and Friedlander ("Selective Transport of Sulfur Dioxide through Polymer Membranes. Part I and Part II", *Ind. Eng. Chem. Process Des. Dev.*, 609–616 and 616–623 (1980)) has established that the permeability of polymers to $SO_2$ is a strong function of the $SO_2$ partial feed pressure. The $SO_2$ permeation rate decreases 8–10 fold if the $SO_2$ partial feed pressure is reduced from 760 mmHg to 8 mmHg. Thus the $SO_2/N_2$ selectivity obtained in this example is outstandingly high and demonstrates the singular capacity of the membranes of the invention to selectively transport polar gases over non-polar gases. The flux under the operating conditions of the example is also an order of magnitude better than the best obtained at 760 mmHg with the literature examples from Table 12.

COMPARATIVE PERFORMANCE EXAMPLES

Example 12

A multilayer composite membrane was prepared as in Example 11. The resulting composite was tested with pure gases at 20° C. as in the other examples. The results achieved by this membrane are compared in Table 12 with ideal permeability data obtained from the Chapter entitled "Permeability Coefficients" by H. Yasuda and V. Stannett in Polymer Handbook, J. Brandrup and I. Immergut (Eds.), Second Edition, Wiley Interscience, New York (1975). The data for polymers numbers 7 and 8 were obtained from a private communication from Nitto Electric Industrial Company, Osaka, Japan.

resentative crystalline or glassy materials. These polymers are identified by the same numbers in FIG. 6. Glassy polymers are generally more permeable to small gas molecules such as hydrogen and helium than larger molecules such as $CO_2$, because the glasses discriminate by molecular size. Thus, the $CO_2/H_2$ selectivities of glassy polymers listed are 0.67, 0.47, 0.68, 2.0 and 0.52, less than 1 in most instances, and close to 1 for polytrimethyl silyl propyne, a polymer with unusual properties. On the other hand, the elastomers, which achieve a $CO_2/H_2$ separation by differences in solubility rather than size, exhibit $CO_2/H_2$ selectivities in the range 2–5. Of the broad range of polymers cited in Polymer Handbook, and shown in FIG. 6, no polymer has a $CO_2/H_2$ selectivity greater than 6. In contrast, the membranes of the present invention consistently achieve selectivities of 9–10.

Figure 6:
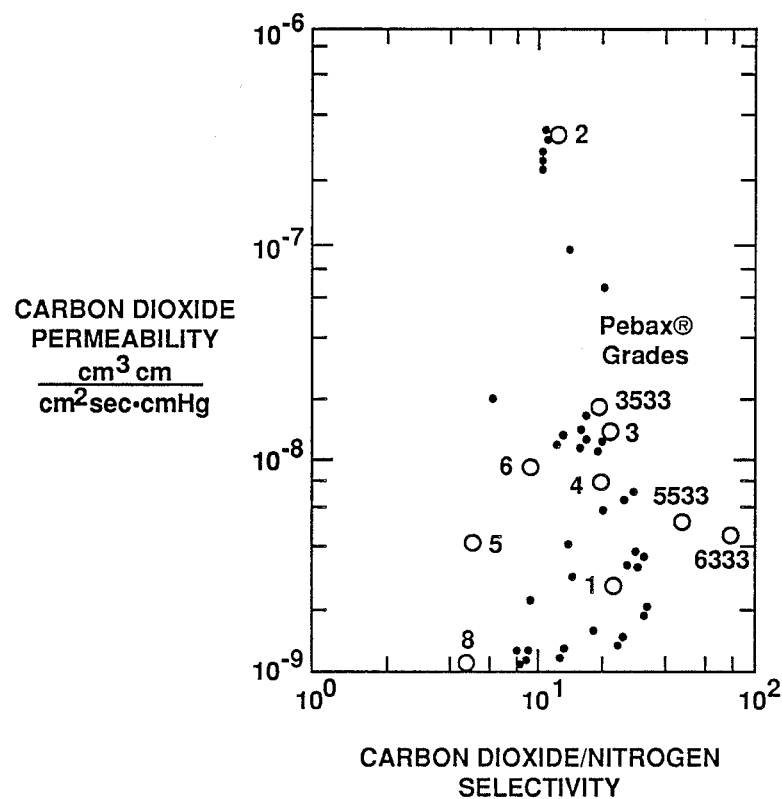
FIG. 6 is a graph of carbon dioxide permeability versus carbon dioxide/nitrogen selectivity for a large number of polymers including three grades of Pebax.

The $CO_2/N_2$ separating performance of this same broad range of polymers is plotted graphically in FIG. 6. As can be seen by reference to the figure, the performance of the polyamide-polyether permselective membranes of the invention offers a better high flux/high selectivity performance than almost all materials.

Example 13

The multilayer composite membranes of example 12 were compared with other polymer membranes cited in the patent literature. The comparative fluxes and selec-

TABLE 12

Gas permeabilities and selectivities for typical elastomeric and glassy polymers, and for Pebax ® grade 4011 composite membranes

| Polymer | No. | Permeability (Barrer)* | | | | | Selectivity | | | | | | | |
|---|---|---|---|---|---|---|---|---|---|---|---|---|---|---|
| | | $H_2$ | $N_2$ | $O_2$ | $CO_2$ | $CH_4$ | $O_2/N_2$ | $H_2/N_2$ | $CO_2/N_2$ | $CH_4/N_2$ | $CO_2/H_2$ | $CO_2/O_2$ | $CO_2/CH_4$ | $H_2/CH_4$ |
| Neoprene | 1 | 13.6 | 1.2 | 4 | 25.8 | 3.77 | 3.3 | 11.3 | 21.5 | 2.7 | 1.9 | 6.5 | 7.9 | 4.2 |
| Dimethyl-siloxane | 2 | 649 | 281 | 605 | 3240 | — | 2.2 | 2.31 | 11.5 | — | 4.99 | 5.4 | — | — |
| Polybuta-diene | 3 | 41.9 | 6.42 | 19 | 138 | — | 3.0 | 6.5 | 21.5 | — | 3.33 | 7.3 | — | — |
| PPO** | 4 | 112 | 3.81 | 15.8 | 75.7 | — | 4.1 | 29.6 | 19.9 | — | 0.67 | 4.8 | — | — |
| Ethyl cellulose | 5 | 87 | 8.4 | 26.5 | 41 | — | 3.2 | 10.4 | 4.9 | — | 0.47 | 1.5 | — | — |
| Polymethyl pentene | 6 | 136 | 7.8 | 32.3 | 72.6 | — | 4.1 | 17.4 | 11.8 | — | 0.68 | 2.9 | — | — |
| Poly-tri-methyl silyl propyne | 7 | 7000 | 2000 | 4000 | 18000 | — | 2.0 | 3.5 | 9.0 | — | 2.0 | 4.5 | 1.8 | — |
| Poly-styrene | 8 | 19.1 | 2.2 | 6.4 | 10 | 2.3 | 2.9 | 8.7 | 4.6 | 1.05 | 0.52 | 1.6 | 4.3 | 8.3 |
| Example*** 12 | | 24 | 3.6 | 9.9 | 219 | 11.9 | 2.7 | 6.6 | 61 | — | 9.1 | 22 | 18 | 2.0 |
| Example*** 14 | | 18 | 2.7 | 7.4 | 185 | 9.2 | 2.7 | 6.6 | 68 | — | 10 | 25 | 20 | 2.0 |

*1 Barrer = 1 × $10^{-10}$ $cm^3$(STP)cm/$cm^2$.s.cmHh.
**PPO: polyphenylene oxide.
***Normalized fluxes for 1 μm-thick membrane. Units are $10^{-6}$ $cm^3$ (STP)/$cm^2$.s.cmHg. Numbers are therefore equivalent to permeabiolities for polymers 1–8.

The polymers listed as numbers 1–3 are representative examples of elastomers; those listed as 4–8 are representative examples of elastomers.

tivities are given in Tables 13 and 14.

TABLE 13

Gas fluxes through multilayer composite Pebax ® 4011 membranes compared with other polymer membranes.

| Membrane | P/l$H_2S$ | P/l$CO_2$ | P/l$CH_4$ | P/l$N_2$ | P/l$H_2$ | P/l$O_2$ | P/l$SO_2$ | P/l$NH_3$ |
|---|---|---|---|---|---|---|---|---|
| | | | | [$cm^3$(STP)/$cm^2$sec.cmHg] | | | | |
| Si-PEG-PSf | 7.81 × $10^{-5}$ | 1.37 × $10^{-7}$ | 5.58 × $10^{-7}$ | 2.05 × $10^{-7}$ | 2.89 × $10^{-6}$ | — | — | 2.25 × $10^{-4}$ |
| U.S. Pat. No. 4,606,740 | 1.07 × $10^{-4}$ | 1.32 × $10^{-5}$ | 6.60 × $10^{-7}$ | 1.32 × $10^{-7}$ | 1.45 × $10^{-6}$ | — | — | 2.89 × $10^{-4}$ |
| Si-PEG-PSf | 9.20 × $10^{-5}$ | 1.55 × $10^{-5}$ | 7.60 × $10^{-7}$ | 2.64 × $10^{-7}$ | 4.74 × $10^{-6}$ | — | 3.32 × $10^{-4}$ | 3.76 × $10^{-4}$ |
| U.S. Pat. No. 4,608,060 | 3.70 × $10^{-5}$ | 6.84 × $10^{-6}$ | 3.22 × $10^{-7}$ | 1.21 × $10^{-7}$ | 2.05 × $10^{-6}$ | — | — | 1.64 × $10^{-4}$ |
| Si-PSf (microporous) | 1.74 × $10^{-4}$ | 6.06 × $10^{-5}$ | 1.41 × $10^{-5}$ | 5.46 × $10^{-6}$ | 1.6 × $10^{-5}$ | — | 4.5 × $10^{-4}$ | 1.9 × $10^{-4}$ |

TABLE 13-continued

Gas fluxes through multilayer composite Pebax ® 4011 membranes compared with other polymer membranes.

| Membrane | P/lH$_2$S | P/lCO$_2$ | P/lCH$_4$ | P/lN$_2$ | P/lH$_2$ [cm$^3$(STP)/cm$^2$sec.cmHg] | P/lO$_2$ | P/lSO$_2$ | P/lNH$_3$ |
|---|---|---|---|---|---|---|---|---|
| U.S. Pat. No. 4,608,060 Si-PSf (RM-composite) | 3.1 × 10$^{-5}$ | 3.78 × 10$^{-5}$ | 2.27 × 10$^{-6}$ | 1.40 × 10$^{-6}$ | 5.5 × 10$^{-5}$ | — | — | 2.1 × 10$^{-4}$ |
| U.S. Pat. No. 4,230,463 *PEG-PSf (ILM) | 2.2 × 10$^{-8}$ | 9.28 × 10$^{-9}$ | 4.27 × 10$^{-10}$ | 1.67 × 10$^{-10}$ | 1.7 × 10$^{-9}$ | — | 4.1 × 10$^{-7}$ | 6.7 × 10$^{-8}$ |
| U.S. Pat. No. 4,608,060 *PEG-PC block copolymer | degraded membranes | 4.83 × 10$^{-10}$ 9.27 × 10$^{-9}$ | — 4.33 × 10$^{-10}$ | 9.45 × 10$^{-11}$ 1.65 × 10$^{-10}$ | — 1.71 × 10$^{-9}$ | — 4.63 × 10$^{-10}$ | 3.54 × 10$^{-7}$ 4.2 × 10$^{-7}$ | — 6.7 × 10$^{-8}$ |
| U.S. Pat. No. 3,653,180 | | | | | | | | |
| Example 12 | 1.65 × 10$^{-3}$ | 2.19 × 10$^{-4}$ | 1.19 × 10$^{-5}$ | 3.61 × 10$^{-6}$ | 2.4 × 10$^{-5}$ | 9.9 × 10$^{-6}$ | — | — |
| Example 14 | 1.75 × 10$^{-3}$ | 1.85 × 10$^{-4}$ | 9.19 × 10$^{-6}$ | 2.73 × 10$^{-6}$ | 1.8 × 10$^{-5}$ | 7.4 × 10$^{-6}$ | — | — |

*Permeability in cm$^3$cm/cm$^2$sec.cmHg. Immobilized liquid membranes.

TABLE 14

Selectivities of multilayer composite Pebax ® 4011 membranes compared with other polymer Membranes

| Membrane | H$_2$S/ N$_2$ | H$_2$S/ CH$_4$ | H$_2$S/ CO$_2$ | H$_2$S/ H$_2$ | CO$_2$/ N$_2$ | CO$_2$/ CH$_4$ | CO$_2$/ O$_2$ | CO$_2$/ H$_2$ | SO$_2$/ N$_2$ | NH$_3$/ N$_2$ | O$_2$/ N$_2$ | H$_2$/ N$_2$ | CO$_2$/ CO |
|---|---|---|---|---|---|---|---|---|---|---|---|---|---|
| Si-PEG-PSf | 381 | 140 | 5.7 | 27 | 67 | 25 | — | 4.7 | — | 1100 | — | 14 | — |
| U.S. Pat. No. 4,606,740 | 811 | 162 | 8.1 | 74 | 100 | 20 | — | 9.1 | — | 2190 | — | 11 | — |
| Si-PEG-PSf | 348 | 121 | 5.9 | 19 | 59 | 20 | — | 3.3 | 1258 | 1424 | — | 18 | — |
| U.S. Pat. No. 4,608,060 | 305 | 115 | 5.4 | 18 | 57 | 21 | — | 3.3 | — | 1355 | — | 17 | — |
| | 382 | 184 | 5.7 | 27 | 67 | 32 | — | 4.7 | — | 1100 | — | 14 | — |
| Si-PSf (microporous) U.S. Pat. No. 4,608,060 | 26 | 9.9 | 2.3 | 8.8 | 11 | 4.3 | — | 3.8 | 82 | 35 | — | 2.9 | — |
| Si-PSf (RM-composite) U.S. Pat. No. 4,230,463 | 22 | 14 | 0.82 | 0.56 | 27 | 17 | — | 0.68 | — | 150 | — | 39 | — |
| PEG-PSf (ILM) U.S. Pat. No. 4,608,060 | 131 | 51 | 2.4 | 13 | 56 | 22 | — | 5.2 | 2455 | 401 | — | 10 | — |
| PEG-PC block copolymer U.S. Pat. No. 3,653,180 | — | — | — | — | 51 | — | — | — | 3746 | — | — | — | — |
| | — | — | — | — | 56 | 21 | 20 | 5.4 | 2485 | 406 | 2.8 | 10 | 29 |
| Example 12 | 457 | 139 | 7.5 | 69 | 61 | 18 | 22 | 9.1 | — | — | 2.7 | 6.6 | — |
| Example 14 | 641 | 190 | 9.5 | 97 | 68 | 20 | 25 | 10 | — | — | 2.7 | 6.6 | — |

These tables confirm the unusual CO$_2$/H$_2$ separating properties demonstrated in Example 12. The SO$_2$ and H$_2$S permeability properties are also exceptionally good. It is difficult to obtain simple comparisons because limited data is available in the literature. However examples, 10, 11 and 14 show that Pebax ® membranes have very high selectivities for H$_2$S and SO$_2$ compared to gases such as CH$_4$, N$_2$ and O$_2$. Only one experiment described in U.S. Pat. No. 4,606,740 yielded selectivities of the same order as our composite for the same approximate range of separations. The corresponding fluxes over the same range of gases were at least an order of magnitude lower.

Example 14

A second multilayer composite was prepared using the same materials and technique as in Example 11 above. The results of tests with this membrane are in good agreement with those from Example 11, as can be seen by comparing the bottom two lines from Tables 13 and 14. This example demonstrates the reproducibilty of results.

PERVAPORATION EXAMPLES

Example 15

A pervaporation experiment was performed using the composite membrane made in Example 5, #1. This membrane had an ultrathin coating of Pebax grade 3533 on a Trogamid support, a carbon dioxide flux of 8.1 × 10$^{-5}$ cm$^3$(STP)/cm$^2$·s·cmHg, and a CO$_2$/N$_2$ selectivity of 27. The membrane was rolled into a spiral-wound module with a calculated membrane area of 1170 cm$^2$. The experimental technique and apparatus was as described in M. H. V. Mulder, J. Oude Hendrikman, H. Hegeman, and C. A. Smolders, "Ethanol-Water Separation by Pervaporation", J. Mem. Sci., 16, 269 (1983). A solution of 7.5 wt. % ethanol in water was used. The liquid feed was circulated at a flow rate of 5 l/min. The temperature of the feed solution was held constant at 30° C. A vacuum of 2 cmHg was applied on the downstream side of the module, and the permeating vapor was collected in a liquid nitrogen trap. The experiment was performed for 10 hours, and the results obtained are summarized in Table 15 below.

TABLE 15

Pervaporation experiment of aqueous ethanol solution using a Pebax ® 3533 Spiral-Wound Membrane Module.

| Time min | Feed conc. wt % ethanol | Permeate conc. wt % ethanol | Permeate flux kg/m2 hr | Selectivity* — |
|---|---|---|---|---|
| 120 | 7.50 | 34.0 | 0.061 | 6.4 |
| 147 | 7.45 | 34.0 | 0.066 | 6.4 |
| 134 | 7.35 | 34.0 | 0.065 | 6.5 |
| 175 | 7.38 | 35.0 | 0.066 | 6.8 |
| 145 | 7.30 | 34.0 | 0.065 | 6.7 |

*selectivity = wt % ratio of permeate components/wt % ratio of feed components.

Example 16

A spiral-wound membrane module as described in Example 15 was used for a pervaporation experiment using 4 wt % ethyl acetate in water. The experimental procedure and parameters were the same as in Example 15. The results of the experiment are summarized in Table 16 below.

TABLE 16

Pervaporation exeriment of aqueous ethyl acetate solution using a Pebax ® 3533 Spiral-Wound Membrane Module.

| Time min | Feed conc. wt % ethylacetate | Permeate conc. wt % ethylacetate | Permeate flux kg/m2 hr | Selectivity* — |
|---|---|---|---|---|
| 120 | 4.20 | 82 | 0.18 | 105 |
| 91 | 3.60 | 82 | 0.21 | 125 |
| 150 | 3.00 | 79 | 0.20 | 120 |
| 136 | 2.10 | 77 | 0.18 | 157 |
| 110 | 1.75 | 74 | 0.18 | 163 |

*selectivity = wt % ratio of permeate components/wt % ratio of feed components.

We claim:

1. A process for separating a component of a first fluid mixture, comprising the steps of:
   bringing said first fluid mixture into contact with the feed side of a separation membrane, said separation membrane comprising a composite of a microporous support membrane coated with a permselective membrane, said permselective membrane comprising a polyamide-polyether block copolymer having the formula:

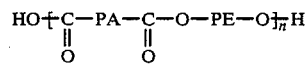

wherein PA is a saturated aliphatic polyamide segment, PE is a polyether segment, and n is a positive integer, wherein said separation membrane exhibits a selectivity as measured with pure gases from carbon dioxide over hydrogen of at least 5.5; and
   withdrawing from the permeate side of said separation membrane a second fluid mixture wherein the proportion of said component is enriched, compared with said first fluid mixture.

2. The process of claim 1, wherein said component comprises a polar gas.

3. The process of claim 1, wherein said component comprises a gas chosen from the group consisting of carbon dioxide, sulfur dioxide and hydrogen sulfide.

4. The process of claim 1, wherein said first fluid mixture comprises an aqueous solution containing a dissolved organic compound.

5. The process of claim 4, wherein said component comprises an organic compound.

6. A process for separating a component of a first fluid mixture, comprising the steps of:
   bringing said first fluid mixture into contact with a feed side of an article of manufacture, said article comprising a laminate of a first microporous support layer coated with a second layer comprising a polyamide-polyether block copolymer having the formula:

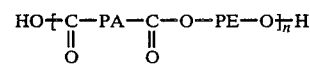

wherein PA is a saturated aliphatic polyamide segment, PE is a polyether segment, and n is a positive integer, wherein said second layer has a thickness less than 10 μm, and wherein said article exhibits a faster permeation rate for one component of a fluid mixture than for another component of said fluid mixture; and
   withdrawing from a permeate side of said article a second fluid mixture wherein the proportion of said component is enriched, compared with said first fluid mixture.

7. The process of claim 6, wherein said component comprises a polar gas.

8. The process of claim 6, wherein said component comprises a gas chosen from the group consisting of carbon dioxide, sulfur dioxide and hydrogen sulfide.

9. The process of claim 6, wherein said first fluid mixture comprises an aqueous solution containing a dissolved organic compound.

10. The process of claim 9, wherein said component comprises an organic compound.

11. A process for separating a component of a first fluid mixture, comprising the steps of:
    bringing said first fluid mixture into contact with the feed side of a separation membrane, said separation memebrane comprising a composite of a microporous support membrane coated with a permselective membrane, said permselective membrane comprising a polyamide-polyether block copolymer having the formula:

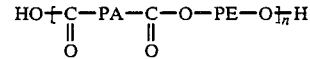

wherein PA is a saturated aliphatic polyamide segment, PE is a polyether segment, and n is a positive integer, wherein said composite is prepared by applying a solution of said polyamide-polyether block copolymer to one side of said microporous support membrane; and
    withdrawing from the permeate side of said separation membrane a second fluid mixture wherein the proportion of said component is enriched, compared with said first fluid mixture.

12. The process of claim 11, wherein said component comprises a polar gas.

13. The process of claim 11, wherein said component comprises a gas chosen from the group consisting of carbon dioxide, sulfur dioxide and hydrogen sulfide.

14. The process of claim 11, wherein said first fluid mixture comprises an aqueous solution containing a dissolved organic compound.

15. The process of claim 14, wherein said component comprises an organic compound.

16. An article of manufacture, comprising a laminate of a first microporous support layer coated with a second layer comprising a polyamide-polyether block copolymer having the formula:

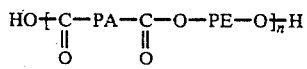

wherein PA is a saturated aliphatic polyamide segment, PE is a polyether segment, and n is a positive integer, wherein said second laye has a thickness less than 10 μm, and wherein said article exhibits a faster permeation rate for one component of a fluid mixture than for another component of said fluid mixture.

17. A separation membrane comprising a composite of a microporous support membrane coated with a permselective membrane, said permselective membrane comprising a polyamide-polyether block copolymer having the formula:

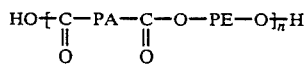

wherein PA is a saturated aliphatic polyamide segment, PE is a polyether segment, and n is a positive integer, wherein said composite is prepared by applying a solution of said polyamide-polyether block copolymer to one side of said microporous support membrane.

18. The separation membrane of claim 17, wherein said permselective membrane has a thickness less than 10 μm.

19. The separation membrane of claim 17, further comprising a sealing layer continuously contacting one surface of said permselective membrane.

20. The separation membrane of claim 19, wherein said sealing layer is between said microporous support and said permselective membrane.

21. A separation membrane comprising a composite of a microporous support membrane coated with a permselective membrane, said permselective membrane comprising a polyamide-polyether block copolymer having the formula:

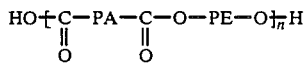

wherein PA is a saturated aliphatic polyamide segment, PE is a polyether segment, and n is a positive integer, wherein said separation membrane exhibits a selectivity as measured with pure gases for carbon dioxide over hydrogen of at least 5.5.

22. The separation membrane of claim 21, wherein said permselective membrane has a thickness less than 10 μm.

23. The separation membrane of claim 21, wherein said permselective membrane is formed by casting a solution comprising said polyamide-polyether block copolymer and a solvent onto said microporous support membrane.

24. The separation membrane of claim 23, wherein said solvent is selected from the group consisting of n-butanol, 1,1,2-trichloroethane and formic acid.

25. The separation membrane of claim 21, further comprising a sealing layer continuously contacting one surface of said permselective membrane.

26. The separation membrane of claim 25, wherein said sealing layer is between said microporous support membrane and said permselective membrane.

27. A process for producing a separation membrane comprising the steps of:

dissolving a polyamide-polyether block copolymer having the formula:

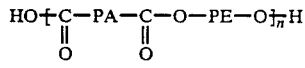

wherein PA is a saturated aliphatic polyamide segment, PE is a polyether segment, and n is a positive integer in a solvent; coating the resultant solution on a microporous support membrane; and drying the coated support membrane to evaporate said solvent.

28. The process of claim 27, wherein said resultant solution contains up to 5 wt % of said polyamide-polyether block copolymer.

29. The process of claim 27, wherein said resultant solution contains up to 2 wt % of said polyamide-polyether block copolymer.

30. The process of claim 27, wherein said solvent is selected from the group consisting of n-butanol, 1,1,2-trichloroethane and formic acid.

* * * * *